Nov. 10, 1925.  
J. F. MERKEL  
1,561,180  
ATTACHING MEANS FOR USE ON WIRE SPOKE WHEELS  
Filed Jan. 19, 1922
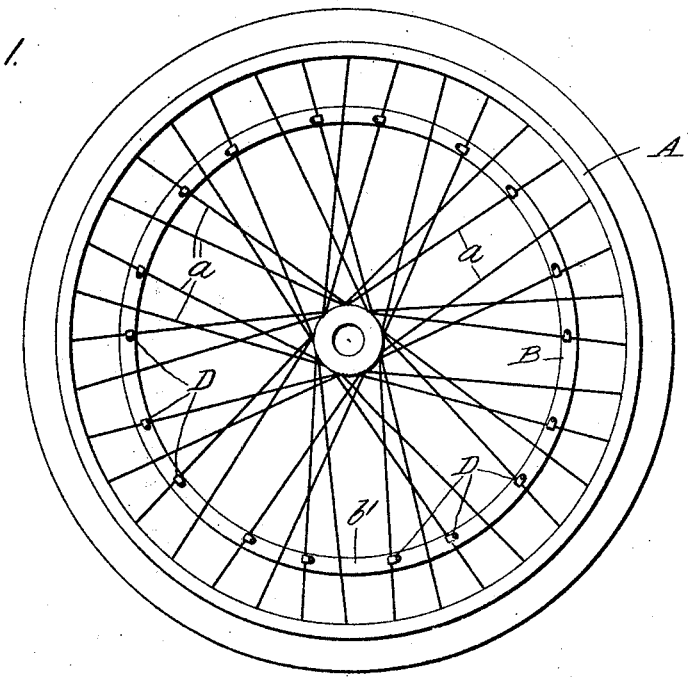
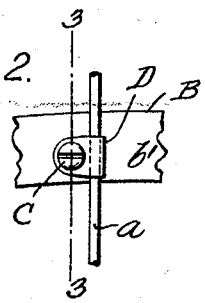
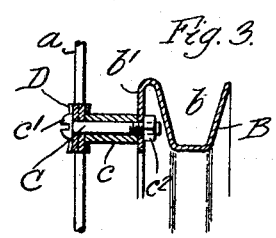
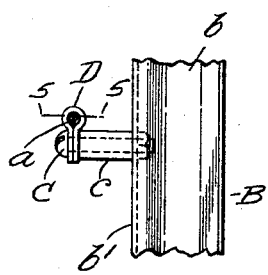
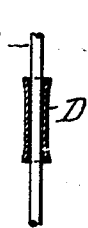
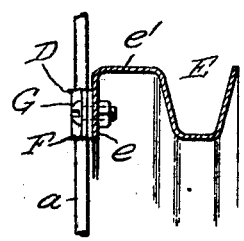
INVENTOR.  
Joseph F. Merkel,  
by Parker & Rochnow,  
his ATTORNEYS.

Patented Nov. 10, 1925.

1,561,180

UNITED STATES PATENT OFFICE.

JOSEPH F. MERKEL, OF ROCHESTER, NEW YORK, ASSIGNOR, BY MESNE ASSIGNMENTS, TO THE G. R. S. PRODUCTS, INC., OF COLONIE, NEW YORK, A CORPORATION OF NEW YORK.

ATTACHING MEANS FOR USE ON WIRE-SPOKE WHEELS.

Application filed January 19, 1922. Serial No. 530,323.

*To all whom it may concern:*

Be it known that I, JOSEPH F. MERKEL, a citizen of the United States, residing at Rochester, in the county of Monroe and State of New York, have invented a new and useful Improvement in Attaching Means for Use on Wire-Spoke Wheels, of which the following is a specification.

This invention relates to attaching means for use on wire spoke wheels, for example, for attaching a driving pulley, brake drum or the like to the spokes of a wire wheel.

The objects of this invention are to provide an improved attachment of this kind which forms a secure connection between the spoke and the article to be attached thereto, and which avoids breaking the spoke and is also inexpensive to manufacture; also to improve attaching means of this kind in other respects hereinafter specified.

In the accompanying drawings:

Fig. 1 is a side elevation of a wire wheel having a member attached thereto by the attaching means embodying the invention.

Fig. 2 is a fragmentary side elevation on an enlarged scale showing the attaching means.

Fig. 3 is a transverse sectional elevation thereof on line 3—3, Fig. 2.

Fig. 4 is a fragmentary view thereof taken approximately perpendicularly to the face of the member attached to the wheel.

Fig. 5 is a sectional elevation thereof on line 5—5, Fig. 4.

Fig. 6 is a transverse sectional view thereof showing the attaching means used in connection with a member of different construction.

The invention is shown in the accompanying drawings as applied to the driving wheel of a motor cycle, but it is not intended to limit the invention to use in connection with motorcycles, since the same may be used for attaching a driving member, brake band, or other device to a wheel used for any other purpose.

In order to drive a motorcycle, power is transmitted from an engine by means of a belt or chain to a driving wheel A, and in the particular construction shown, a belt is intended to be used which cooperates with a belt rim, pulley or other driven member B. The wheel shown is provided with wire spokes $a$ to which the driven member B is secured, and the driven member is provided with an annular groove $b$ in which the driving belt, not shown, is intended to operate. The belt rim also has an annular flange or part $b'$ which is adapted to be connected with the spokes $a$. In the construction shown for this purpose, the flange $b'$ of the belt rim or pulley is connected with the spokes $a$ by means of bolts or the like C extending through spoke clamps D, and in the construction shown in Figs. 1-5, the bolts also extend through tubular spacing members $c$. Each clamp D is in the form of a comparatively thin plate of metal adapted to be bent around a spoke and provided in its opposite ends with holes through which the bolt C passes for securing the ends of the clamp together. The bolt C is provided with a head $c'$ which is preferably round, and a nut $c^2$ which is arranged in the space between the flange $b'$ and the body portion of the belt rim. The head $c'$ is arranged to engage the spoke clamp D in close proximity to the spoke $a$ in such a manner that the middle portion of the spoke clamp will be securely pressed against the spoke by the head $c'$ of the bolt and the spacing tube $c$, while the portions of the clamp engaging the spoke which are spaced at greater distances from the bolt head $c'$ and the spacing tube $c$ are not pinched into engagement with the spoke to the same extent as the central portion of the spoke clamp. Consequently, the portions of the spoke clamp engaging the spoke assume a shape somewhat as indicated in Fig. 5, causing the middle portions of the spoke clamps to engage the spokes tightly while the portions of the clamps at a distance from the middle portions either engage the spokes quite loosely or are entirely out of contact with the spokes. This has a decided advantage in that the spoke clamps by engaging the spokes in this manner do not tend to shear the spokes or subject the spokes to a sharp bend, when the power for turning the driving wheel is transmitted from the belt rim to the spokes. The connecting means are also inexpensive to make and afford a secure and reliable connection between the belt rim and the spokes.

In the alternative construction shown in

Fig. 6, the spacing tubes c are omitted and a belt rim or pulley E is used which is provided with a flange e spaced from the grooved portion of the belt rim by means of a web or connecting portion e'. In this case the spoke clamps F are of the same construction as shown in Figs. 1-5, and a bolt G connects the spoke clamps directly to the flange e of the belt rim. The action of the connecting bolt G is the same as that of the bolt C, namely that the head of the bolt pinches the middle portion of the spoke clamp and not the edge portions thereof so that the tendency to bend the spokes at the edges of the spoke clamp is avoided, and the strains resulting from the power which is transmitted from the belt rim to the driving wheel are distributed over a larger portion of each spoke.

The attaching means described are not only simple and inexpensive to manufacture, but also greatly reduce the tendency of the spokes to break.

I claim as my invention:

1. In a motorcycle, the combination of a driving wheel having spokes, a driven member, and means for securing said driven member to said spokes, including sheet metal strips bent around and clamped to said spokes, and means connecting the ends of said strips and securing said ends to said driven member.

2. In a motorcycle, the combination of a driving wheel having spokes, a driven member, and means for securing said driven member to said spokes, including sheet metal strips bent around and clamped to said spokes, and bolts extending through the ends of said strips and secured to said driven member.

3. In a motorcycle, the combination of a driving wheel having spokes, a driven member, and means for securing said driven member to said spokes, including sheet metal strips bent around said spokes and having holes in their end portions, and bolts extending through said end portions and secured to said driven member, the heads of said bolts pressing the middle portions of said strips tightly into engagement with said spokes and leaving the other portions of said strips in loose engagement with said spokes.

4. In a motorcycle, the combination of a driving wheel having spokes, a driven member, and means for securing said driven member to said spokes, including sheet metal strips bent around said spokes, and means connecting the ends of said strips and securing said ends to said driven member, said means engaging the middle portions of said strips and drawing said middle portions into rigid engagement with said spokes, and causing other portions of said strips to engage said spokes loosely.

JOSEPH F. MERKEL.